US006622920B2

(12) United States Patent
Ho et al.

(10) Patent No.: US 6,622,920 B2
(45) Date of Patent: Sep. 23, 2003

(54) OPERATING BUTTON WITH MULTIPLE FUNCTIONS FOR A HANDHELD PRODUCT

(75) Inventors: San-Chi Ho, Yunghe (TW); Chien-Min Lin, Junghe (TW)

(73) Assignee: High Tech Computer Corporation, Taoyuan (TW)

( * ) Notice: Subject to any disclaimer, the term of this patent is extended or adjusted under 35 U.S.C. 154(b) by 228 days.

(21) Appl. No.: 09/810,443

(22) Filed: Mar. 19, 2001

(65) Prior Publication Data

US 2002/0056617 A1 May 16, 2002

(30) Foreign Application Priority Data

Jul. 20, 2000 (TW) .................................... 89212580 U

(51) Int. Cl.[7] .................................... G06K 7/10

(52) U.S. Cl. .................. 235/472.01; 235/379; 235/381; 235/380; 455/90; 455/558; 361/681

(58) Field of Search ................................ 235/379, 381, 235/472.01, 380; 455/90, 558; 361/681

(56) References Cited

U.S. PATENT DOCUMENTS 5,949,643 A * 9/1999 Batio ......................... 361/681
6,102,802 A * 8/2000 Armstrong ................... 463/37
6,118,986 A * 9/2000 Harris et al. .................. 455/90
6,119,931 A * 9/2000 Novogrod ................... 235/379
6,374,164 B1 * 4/2002 Eklind et al. .................. 701/2

FOREIGN PATENT DOCUMENTS

JP 410012097 * 1/1998 .......... H01H/25/04

OTHER PUBLICATIONS

Single-key cursor control, Dec. 1983, IBM Technical Disclosure Bulletin.*

* cited by examiner

*Primary Examiner*—Karl D. Frech
*Assistant Examiner*—Kim Nguyen
(74) *Attorney, Agent, or Firm*—Rabin & Berdo, P.C.

(57) ABSTRACT

An operating button with multiple functions comprising the functions of the four-direction control key, the action control key and the speaker is equipped in the handheld products. The operating button includes the housing, the four-direction and action control assembly, and the speaker, wherein the four-direction and action control assembly includes a spring.

18 Claims, 2 Drawing Sheets

OPERATING BUTTON WITH MULTIPLE FUNCTIONS FOR A HANDHELD PRODUCT

This application incorporates by reference Taiwanese application Ser. No. 089212580, Filed Jul. 20, 2000.

BACKGROUND OF THE INVENTION

1. Field of the Invention

The invention relates in general to an operating button with multiple functions equipped in the handheld products, and more particularly to the operating button comprising of the four-direction control key, the action control key and the speaker.

2. Description of the Related Art

With the rapid evolution of high technology, electronic products are being developed quickly. A trend of this development is towards portability. Portable electronic products can help people dealing with personal information and daily work, and allows the user to control what, when, where, and how he or she receives and manipulates information due to a great diversity of function thereof. Hence, the handheld products such as Personal Digital Assistants (PDA), cellular phone and play station have become popular.

In their leisure time, many people entertain themselves or kill time by playing games. The conventional handheld products on which users play games have a few of defects:

(1) The direction control key and the action control key are set separately so that the size of the handheld product is increasing; it is not easy to operate, moreover, the big size of the handheld product is not convenient to carry and put in the pocket.

(2) The speaker position in the handheld product affects not only the size of the handheld product but also player's sense of hearing.

Recently, the handheld products with games have been designed that have the two-in-one button combining the functions of the direction control key and the action control key. The message receiver, which is able to receive the message from the direction control key and the action control key, is a mini plastic joystick. However, this mini plastic joystick cannot bear too much external force. The mini plastic joystick may be bear high pressure by user's excited swaying, resulting in shortening of using time. Users also easily sway the mini plastic joystick due to careless touch. Additionally, the vertical length of the mini plastic joystick is larger than that of a button, resulting in increase of the overall thickness of the handheld product; the appearance of the handheld product is therefore taking up too much space and cumbersome.

SUMMARY OF THE INVENTION

It is therefore an object of the invention to provide an operating button with multiple functions comprising of the speaker, the four-direction control key and the action control key, which saves more space and bears higher pressure.

The invention achieves the above-identified objects by providing an operating button with multiple functions equipped in the handheld products. The operating button includes the housing, the four-direction and action control assembly, and the speaker. The four-direction and action control assembly including a spring is set under the housing, and connected to the printed circuit board (PCB) of the handheld products.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
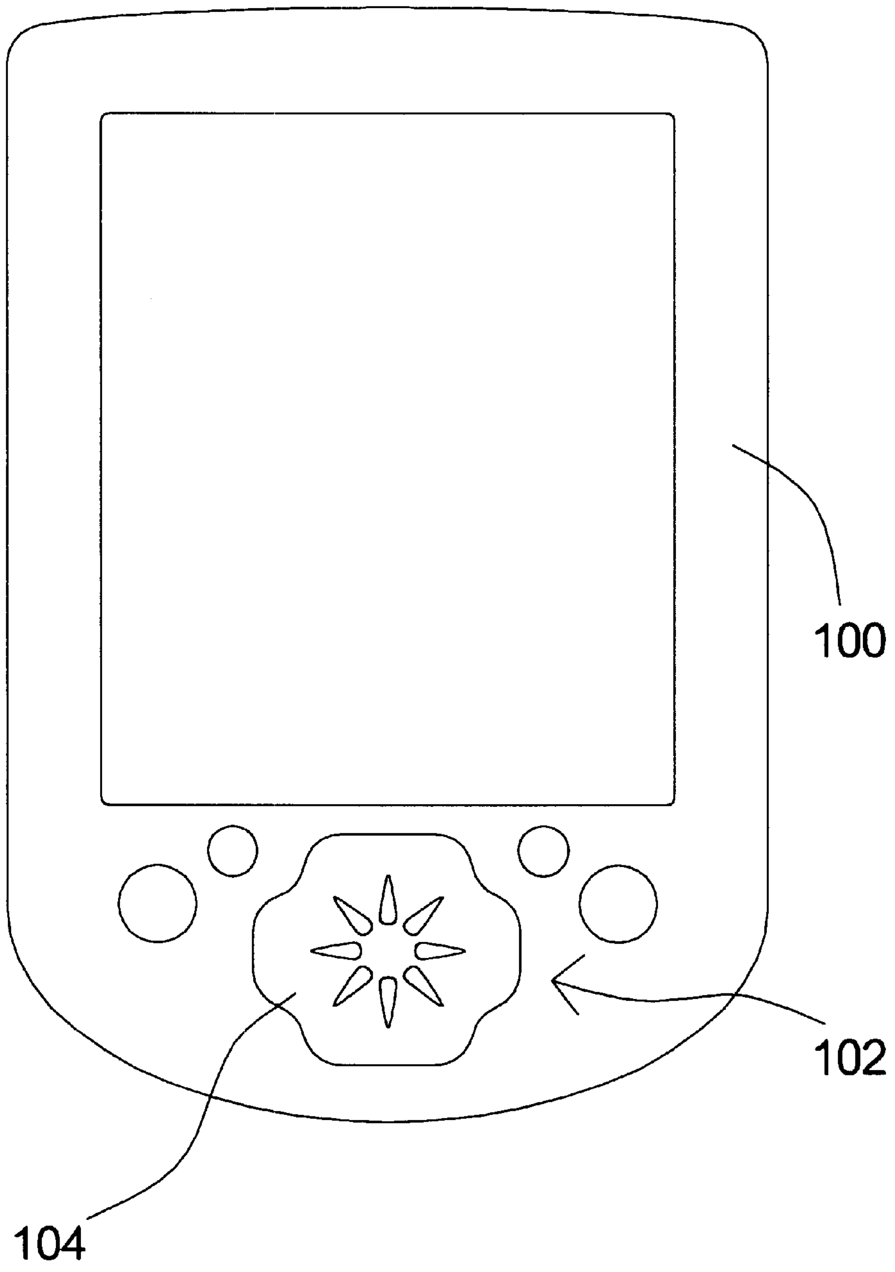
FIG. 1 illustrates a front view of the operating button with multiple functions equipped in Personal Digital Assistant (PDA) according to the invention.

Referring to FIG. 1, which depicts a front view of the operating button with multiple functions equipped in Personal Digital Assistant (PDA) according to the invention. This description of the present invention by taking PDA 100 as example is not intended to limit the claims which are attached below. Those of ordinary skill in the art will appreciate that modifications and substitutions may be made without departing from the spirit of the present invention nor the claims attached below. The operating button with multiple functions may be applied in other handheld products such as handheld computers and cellular phones. The operating button with multiple functions 102 exposed in the housing of the PDA 100, includes the functions of the four-direction control key, the action control key and the speaker.

In order to achieve the three functions above, the operating button with multiple functions 102 is mainly including the housing 104, the four-direction and action control assembly 300, and the speaker 106.

Figure 2:
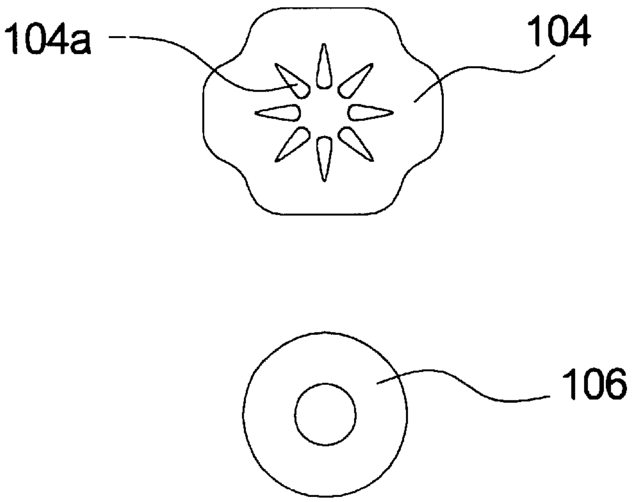
FIG. 2 illustrates a diagram of the speaker of the operating button with multiple functions according to the invention.

Referring to FIG. 2, which depicts a diagram of the speaker of the operating button with multiple functions according to the invention. The speaker 106 is located under the housing 104. There are crevices 104*a* in the housing 104, which is able to transmit sounds of the speaker 106. The number of the crevices 104*a* is preferably chosen as eight, and the arrangement of the crevices is petal-like.

Figure 3:
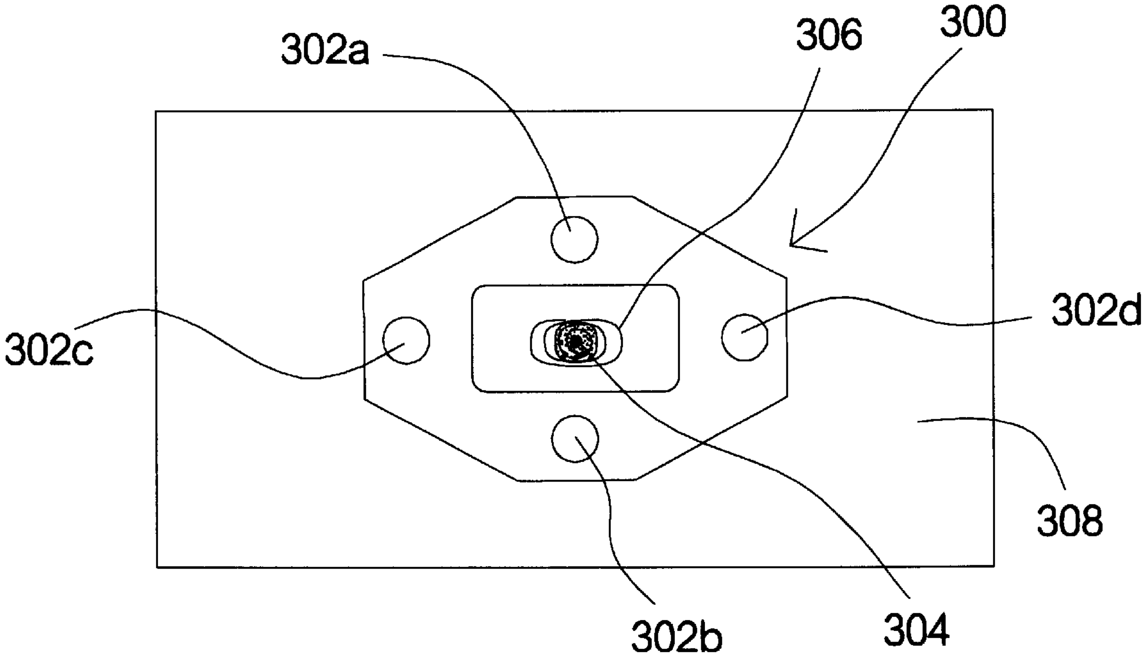
FIG. 3 illustrates a front view of the four-direction and action control assembly of the operating button with multiple functions according to the invention.

Referring to FIG. 3, which depicts a front view of the four-direction and action control assembly of the operating button with multiple functions according to the invention. The four-direction and action control assembly 300 set under the speaker 106 includes the four-direction rubber membrane 302*a*–302*d*, the action message receiver 304 and the spring 306. When a user presses the housing 104 at the forward, backward, leftward and rightward directions, the forward message receiving membrane 302*a*, the backward message receiving membrane 302*b*, the leftward message receiving membrane 302*c* and rightward message receiving membrane 302*d* which are connected to the printed circuit board (PCB) 308 receive the pressure messages respectively, resulting in the transmission of electric signal. The four-direction rubber membrane 302 surrounds the action message receiver 304. The spring 306 is around and also above the action message receiver 304. When user presses the center or near to the center of the housing 104, the action message receiver 304 receives the pressure messages resulting in the transmission of electric signal by the PCB 308. Moreover, the spring 306 is capable of propping the housing 104, so that it can prevents not only the operating button from careless touching but also the housing from falling off.

According to the invention, the operating button with multiple functions equipped in the handheld products possesses the advantages including:

1. the operating button combining the four-direction control key, the action control key and the speaker not only saves the space of the hardware but also decreases the cost of production;
2. It is able to bear much higher pressure than the conventional plastic support by utilizing the spring around the action message receiver, and the overall thickness of the handheld product equipped with the operation button is also decreased; and
3. It is more smooth and direct to use the four-direction rubber membrane, which is made of rubber, as the medium for transmitting message.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operating button with multiple functions, for inclusion in a handheld product, the operating button comprising:

a housing having plural crevices for transmitting sound;

a four-direction and action control assembly located under the housing and connected to a printed circuit board (PCB) of the handheld product, wherein the four-direction and action control assembly includes a spring; and a speaker located under the housing and above the four-direction and action control assembly.

2. The operating button with multiple functions according to claim 1, wherein the housing has eight crevices, and the arrangement of the crevices on the housing is petal-like.

3. The operating button with multiple functions according to claim 1, wherein the four-direction and action control assembly further comprises:

a four-direction rubber membrane; and an action message receiver located at the center of the four-direction rubber membrane and around by the spring.

4. The operating button with multiple functions according to claim 3, wherein the four-direction and action control assembly includes:

a forward message receiving membrane, a backward message receiving membrane, a leftward message receiving membrane and a rightward message receiving membrane to receive the pressure messages of the forward, backward, leftward and rightward directions respectively, wherein the four-direction and action control assembly are connected to the PCB.

5. The operating button with multiple functions according to claim 4, wherein the forward message receiving membrane, the backward message receiving membrane, the leftward message receiving membrane, and the rightward message receiving membrane surround the action message receiver.

6. The operating button with multiple functions according to claim 3, wherein the action message receiver connected to the PCB receives the pressure message while user presses the center or near to the center of the housing.

7. The operating button with multiple functions according to claim 1, wherein the operating button with multiple functions is equipped in a Personal Digital Assistant (PDA).

8. The operating button with multiple functions according to claim 1, wherein the operating button with multiple functions is equipped in a cellular phone.

9. The operating button with multiple functions according to claim 1, wherein the operating button with multiple functions is equipped in a handheld computer.

10. An operating button for inclusion in a handheld product, comprising:

a housing;

a direction and action control assembly located under the housing and connected to a printed circuit board (PCB) of the handheld product, wherein when the housing is depressed the direction and action control assembly is activated; and a speaker located between the housing and the direction and action control assembly.

11. The operating button according to claim 10, wherein the direction and action control assembly comprises:

a four-direction rubber membrane;

an action message receiver located at a center of the four-direction rubber membrane; and a spring around the action message receiver.

12. The operating button according to claim 11, wherein the operating button is adapted for includes in a Personal Digital Assistant (PDA).

13. A handheld product, comprising:

a product housing;

a printed circuit board (PCB) within the product housing; and an operating button exposed at an outer surface of the product housing, the operating button including a button housing, a direction and action control assembly located under the button housing and connected to the PCB, wherein when the button housing is depressed the direction and action control assembly is activated, and a speaker located between the button housing and the direction and action control assembly.

14. The handheld product according to claim 13, where the operating button is a multi-function operating button.

15. The handheld product according to claim 14, wherein the direction and action control assembly is a four-direction and action control assembly including a spring.

16. The handheld product according to claim 14, wherein the button housing has plural crevices for transmitting sound from the speaker.

17. The handheld product according to claim 14, wherein the direction and action control assembly comprises:

a four-direction rubber membrane;

an action message receiver located at a center of the four-direction rubber membrane; and a spring around the action message receiver.

18. The handheld product according to claim 17, wherein said handheld product is a Personal Digital Assistant (PDA).

* * * * *